US007723633B2

(12) United States Patent
Hanson et al.

(10) Patent No.: US 7,723,633 B2
(45) Date of Patent: May 25, 2010

(54) SEQUENCING SYSTEM AND METHOD OF USE

(75) Inventors: Bruce H. Hanson, Endicott, NY (US); Hajime Morikawa, Tokyo (JP); Jason McLaughlin, Owego, NY (US); J. Edward Roth, Lansdale, PA (US); Michael Wisniewski, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 562 days.

(21) Appl. No.: 10/630,754

(22) Filed: Jul. 31, 2003

(65) Prior Publication Data

US 2005/0040084 A1 Feb. 24, 2005

(51) Int. Cl.
*B07C 5/00* (2006.01)
*G06F 7/00* (2006.01)

(52) U.S. Cl. ...................................... 209/584; 700/223

(58) Field of Classification Search ................. 209/584, 209/900; 700/223–228
See application file for complete search history.

(56) References Cited

U.S. PATENT DOCUMENTS 3,184,061 A 5/1965 Levy
3,420,368 A 1/1969 Rosenbert et al.
3,452,509 A 7/1969 Hauer
3,520,404 A 7/1970 Pine
3,596,782 A 8/1971 Morris, Sr.
3,774,758 A 11/1973 Sternberg
3,815,083 A 6/1974 Dirks et al.

(Continued)

FOREIGN PATENT DOCUMENTS

DE 1 160 225 12/1963

(Continued)

OTHER PUBLICATIONS van Mechelen, G, "Automatic Indexing Machine for Mail-Handling Systems", Electrical Communication, vol. 44, No. 1, pp. 72-76, 1969.

(Continued)

*Primary Examiner*—Patrick Mackey
*Assistant Examiner*—Mark Hageman
(74) *Attorney, Agent, or Firm*—Leland Schultz; Roberts Mlotkowski Safran & Cole, P.C.

(57) ABSTRACT

A system and method that sequences product to increase machine throughput. A plurality of input feeding devices each randomly receives products from a stream of product. A plurality of output groups corresponding to the plurality of input feeding devices are provided during a first pass phase and a second pass phase. The plurality of input feeding devices feed the product to output bins of the plurality of output groups. A control has a first mode of operation and a second mode of operation for a first pass phase and a second pass phase, respectively. In the first mode, the control allows all input feeding devices of the plurality of input feeding devices complete access to all output groups of the plurality of output groups during the first pass phase. In the second mode, the control constrains placement of the products to output groups assigned in the first pass phase such that the groupings of the products to the assigned output groups remain constant between the first pass phase and the second pass phase.

20 Claims, 4 Drawing Sheets

U.S. PATENT DOCUMENTS

| | | | |
|---|---|---|---|
| 4,014,784 | A | 3/1977 | Dunlap |
| 4,117,975 | A | 10/1978 | Gunn |
| 4,171,746 | A | 10/1979 | Talyzin et al. |
| 4,172,525 | A | 10/1979 | Hams et al. |
| 4,247,008 | A | 1/1981 | Dobbs |
| 4,295,206 | A | 10/1981 | Cain et al. |
| 4,358,016 | A | 11/1982 | Richardson et al. |
| 4,503,977 | A | 3/1985 | Kohno et al. |
| 4,507,739 | A | 3/1985 | Haruki et al. |
| 4,520,447 | A | 5/1985 | Nara |
| 4,566,595 | A | 1/1986 | Fustier |
| 4,601,396 | A | 7/1986 | Pavie |
| 4,611,280 | A | 9/1986 | Linderman |
| 4,611,310 | A | 9/1986 | Durbin |
| 4,632,252 | A | 12/1986 | Haruki et al. |
| 4,641,753 | A | 2/1987 | Tamada |
| 4,796,196 | A | 1/1989 | Durst, Jr. et al. |
| 4,809,187 | A | 2/1989 | Adams |
| 4,868,570 | A | 9/1989 | Davis |
| 4,963,251 | A | 10/1990 | Böhm et al. |
| 4,998,626 | A | 3/1991 | Ota |
| 5,005,124 | A | 4/1991 | Connell et al. |
| 5,042,667 | A | 8/1991 | Keough |
| 5,058,750 | A | 10/1991 | Graese |
| 5,097,959 | A | 3/1992 | Tilles et al. |
| 5,097,960 | A | 3/1992 | Tilles et al. |
| 5,119,954 | A | 6/1992 | Svyatsky et al. |
| 5,174,454 | A | 12/1992 | Parkander |
| 5,346,072 | A | 9/1994 | Dian et al. |
| 5,353,938 | A | 10/1994 | LaGrange et al. |
| 5,363,971 | A | 11/1994 | Weeks et al. |
| 5,385,243 | A | 1/1995 | Jackson et al. |
| 5,419,457 | A | 5/1995 | Ross et al. |
| 5,421,464 | A | 6/1995 | Gillmann et al. |
| 5,687,850 | A | 11/1997 | Speckhart et al. |
| 5,727,200 | A | 3/1998 | Narita et al. |
| 5,730,299 | A | 3/1998 | Helsley |
| 5,810,174 | A | 9/1998 | Hamada et al. |
| 5,852,826 | A | 12/1998 | Graunke et al. |
| 5,857,186 | A | 1/1999 | Narita et al. |
| 5,893,464 | A | 4/1999 | Kiani et al. |
| 5,901,855 | A | 5/1999 | Uno et al. |
| 5,924,576 | A | 7/1999 | Steenge |
| 5,990,438 | A | 11/1999 | Yamashita et al. |
| 6,054,666 | A | 4/2000 | Yamashita et al. |
| 6,064,023 | A | 5/2000 | Lile et al. |
| 6,075,873 | A | 6/2000 | Kondou et al. |
| 6,082,521 | A | 7/2000 | Maier et al. |
| 6,107,587 | A | 8/2000 | Itoh et al. |
| 6,107,588 | A * | 8/2000 | De Leo et al. .............. 209/584 |
| 6,107,589 | A | 8/2000 | Yamashita et al. |
| 6,126,017 | A | 10/2000 | Hours |
| 6,166,346 | A | 12/2000 | Yamashita et al. |
| 6,219,994 | B1 | 4/2001 | Taniguchi |
| 6,227,378 | B1 | 5/2001 | Jones et al. |
| 6,239,397 | B1 | 5/2001 | Rosenbaum et al. |
| 6,274,836 | B1 * | 8/2001 | Walach ........................ 209/584 |
| 6,276,509 | B1 | 8/2001 | Schuster et al. |
| 6,279,750 | B1 | 8/2001 | Lohmann |
| 6,311,846 | B1 | 11/2001 | Hayduchok et al. |
| 6,316,741 | B1 | 11/2001 | Fitzgibbons et al. |
| 6,337,451 | B1 | 1/2002 | De Leo |
| 6,501,041 | B1 | 12/2002 | Burns et al. |
| 6,703,574 | B1 | 3/2004 | Kecher et al. |

FOREIGN PATENT DOCUMENTS

| | | | |
|---|---|---|---|
| DE | 1160225 | | 12/1963 |
| DE | 1 574 092 | | 3/1971 |
| DE | 1574092 | | 3/1971 |
| DE | 1 574 564 | | 11/1971 |
| DE | 1574564 | | 11/1971 |
| DE | 24 43 418 | | 3/1976 |
| DE | 2443418 | | 3/1976 |
| DE | 27 42 802 | | 4/1979 |
| DE | 2742802 | | 4/1979 |
| DE | 27 54 469 | | 7/1979 |
| DE | 2754469 | | 7/1979 |
| DE | 29 08 500 | | 9/1980 |
| DE | 2908500 | | 9/1980 |
| DE | 43 02 231 | C2 | 8/1995 |
| DE | 4302231 | | 8/1995 |
| DE | 1 9647973 | | 9/1997 |
| DE | 196 47 973 | C1 | 9/1997 |
| DE | 1 9709232 | | 11/1997 |
| DE | 197 03 232 | A1 | 11/1997 |
| DE | 197 09 232 | A1 | 11/1997 |
| DE | 1 9625007 | | 1/1998 |
| DE | 1 9629125 | | 1/1998 |
| DE | 196 25 007 | A1 | 1/1998 |
| DE | 196 29 125 | A1 | 1/1998 |
| EP | 0 428 416 | A1 | 5/1991 |
| EP | 0 428 416 | B1 | 5/1991 |
| EP | 0428416 | | 5/1991 |
| EP | 0 533 536 | B1 | 3/1996 |
| EP | 0533536 | | 3/1996 |
| EP | 0 761 322 | A1 | 3/1997 |
| EP | 0761322 | | 3/1997 |
| EP | 0 862 853 | A1 | 9/1998 |
| EP | 0 862 953 | A1 | 9/1998 |
| EP | 0 916 412 | B1 | 3/2003 |
| EP | 0916412 | | 3/2003 |
| GB | 0944747 | | 12/1963 |
| WO | WO 93/14008 | | 7/1993 |

OTHER PUBLICATIONS

McPartland, BJ., "Centralizing the Control of Postal Service Conveyor Systems", Electrical Construction and Maintenance, vol. 86, No. 6, pp. 49-56, Jun. 1987.

van Mechelen, G. "Automatic Indexing Machine for Mail-Handling Systems", Electrical Communication, vol. 44, No. 1, pp. 72-76, 1969.

* cited by examiner

SEQUENCING SYSTEM AND METHOD OF USE

BACKGROUND OF THE INVENTION

1. Field of the Invention

The invention generally relates to a sequencing system and method of use and, more particularly, to a sequencing system using multiple induction points to sequence products and a method of use.

2. Background Description

The sorting of mail is a very complex, time consuming task. In general, the sorting of mail is processed though many stages, including processes which sort or sequence the mail in delivery order sequence. These processes can either be manual or automated, depending on the mail sorting facility, the type of mail to be sorted such as packages, flats and letters and the like. A host of other factors may also contribute to the automation of the mail sorting, from budgetary concerns to modernization initiatives to access to appropriate technologies to a host of other factors.

In general, however, most modern mail handling facilities have taken major steps toward automation by the implementation of a number of technologies. These technologies include, amongst others, letter sorters, parcel sorters, advanced tray conveyors, flat sorters and the like. As a result of these developments, postal facilities and other mail handling facilities have become quite automated over the years, considerably reducing overhead costs. Without these automated systems, it would be virtually impossible for the postal system such as the United States Postal Service (USPS) to efficiently deliver mail pieces in a time sensitive and cost efficient manner. But, further developments must still be made in order to ever increase throughput and capacity of these automated systems.

In known automated systems, the mail pieces are provided in random order to the postal service or other mail handling facility. At these mail facilities, the mail pieces are then sequenced in delivery point order by many different, complex processes and systems. In one type of automated system, for example, a multiple pass process is utilized with a single induction point, i.e., input feeding device. In these systems, bar code readers (e.g., optical character recognition (OCR)) and transport systems are used to read and sort the mail pieces in a delivery point sequence. In general, the mail pieces are fed through the single induction point for a first pass sorting. Thereafter, the mail pieces are again fed through the same single induction point to sort the mail pieces in a delivery point sequence. But, using this type of system involves considerable machine overhead and accuracy.

By use of a specific example, a carousel-type system with a single induction point is typically able to handle approximately 8,000 pieces of mail per hour, and uses different holding trays or bins for different sets of delivery points. In using this type of system, utilizing a two pass algorithm, directions are assigned to a set of delivery points, all of which are assigned to output bins or holding trays of the carousel. Taking four directions with 16 delivery points, for example, a first portion of the algorithm may assign the following directions to each delivery point:

| Directions | Delivery Points | | | |
|---|---|---|---|---|
| Direction #1 | 1 | 5 | 9 | 13 |
| Direction #2 | 2 | 6 | 10 | 14 |
| Direction #3 | 3 | 7 | 11 | 15 |
| Direction #4 | 4 | 8 | 12 | 16 |

However, these sets of delivery points are not in any particular order. Thus, in such an arrangement, the holding trays are removed from the system, and the mail is then fed back through the single induction point. In doing so, it is now possible to reassign the directions in the following manner, for example,

| Directions | Delivery Points | | | |
|---|---|---|---|---|
| Direction #1 | 1 | 2 | 3 | 4 |
| Direction #2 | 5 | 6 | 7 | 8 |
| Direction #3 | 9 | 10 | 11 | 12 |
| Direction #4 | 13 | 14 | 15 | 16 |

Now, each direction is provided in a sequenced set of delivery points. That is, direction 1 has delivery points for 1, 2, 3 and 4. Direction 2 has delivery points for 5, 6, 7, and 8. Direction 3 has delivery points for 9, 10, 11 and 12. Lastly, direction 4 has delivery points for 13, 14, 15 and 16.

Although this type of system is an improvement over manual sorting and sequencing, throughput and capacity of the machine is limited by the single induction point, e.g., input feeding device. Additionally, capacity may be considerably decreased due to misread mail pieces, overcapacity of the system and other known problems.

To increase capacity, other systems are known to use two inductions points. But, in these systems, complications arise due to system constraints such as, for example, machine error, i.e., reading errors, rigidly assigned output grouping schemes and the like, all of which may contribute to a reduced capacity of such system. In the situation of rejected mail pieces, for example, reject output bins are provided in each output group to ensure proper sequencing of the "non-rejected" mail pieces. This system constraint reduces the capacity of the system by an exponential factor. In a two induction point system, using five output bins per grouping, for example, the capacity of the system is reduced by 18 processing points (i.e., (5 original bins$^2$+5 original bins$^2$)−(4 used bins$^2$+4 used bins$^2$)). Of course, the more output groups, the larger the reduction in capacity.

Additionally, in such systems, due to the manner in which output bins are assigned in the first and second pass sorting, sorting complications, both manually and automatically, are encountered during the induction phase between the first pass sort to the second pass sort. This has a tendency to not only complicate the sort process, but also considerably decrease (slow down) the throughput of the system.

The invention is directed to overcoming one or more of the problems as set forth above.

SUMMARY OF THE INVENTION

In a first aspect of the invention, a plurality of input feeding devices each randomly receives products from a stream of product. A plurality of output groups corresponding to the plurality of input feeding devices are provided during a first pass phase and a second pass phase. The plurality of input feeding devices feed the product to output bins of the plurality of output groups. A control has a first mode of operation and a second mode of operation for a first pass phase and a second pass phase, respectively. In the first mode, the control allows all input feeding devices complete access to all output groups during the first pass phase. In the second mode, the control constrains placement of the products to output groups assigned in the first pass phase such that the groupings of the products to the assigned output groups remain constant between the first pass phase and the second pass phase.

In another aspect of the invention, the system includes a plurality of input feeding devices each randomly receiving products from a stream of product and a plurality of output groups corresponding to the plurality of input feeding devices during a first pass phase and a second pass phase. A control allows all input feeding devices complete access to all output groups during the first pass phase and assigns contiguous output bins to predetermined output groups of the plurality of output groups and associates each of the predetermined output groups with respective input feeding devices such that the predetermined output groups remain constant between the first pass phase and the second pass phase.

In another aspect of the invention, a method is provided for sequencing product. The method includes providing a plurality of product from a stream of product to any of a plurality of input devices and feeding each of the plurality of product, in a first pass phase, to an assigned group of output bins based on a code associated with the each of the product. The product is fed by the input devices. The method further includes assigning each of the plurality of input devices to each of the assigned group of output bins. In an embodiment, the method further includes constraining placement of the product during a second pass phase to the assigned group of output bins such that the assigned group of output bins remains constant between the first pass phase and a second pass phase.

DETAILED DESCRIPTION OF EMBODIMENTS OF THE INVENTION

The invention is directed to a sequencing system and method for increasing machine throughput. In an aspect of the invention, the sequencing system and method increases machine throughput of mail pieces such as packages, flats, mixed mail and the like (generally referred hereinafter as product). The system and method significantly reduces processing times for sequencing the products in delivery point sequence using, in an embodiment, parallel processing. Other applications such as warehousing and storage applications are also contemplated for use with the invention.

Sequencing System of the Invention

Figure 1:
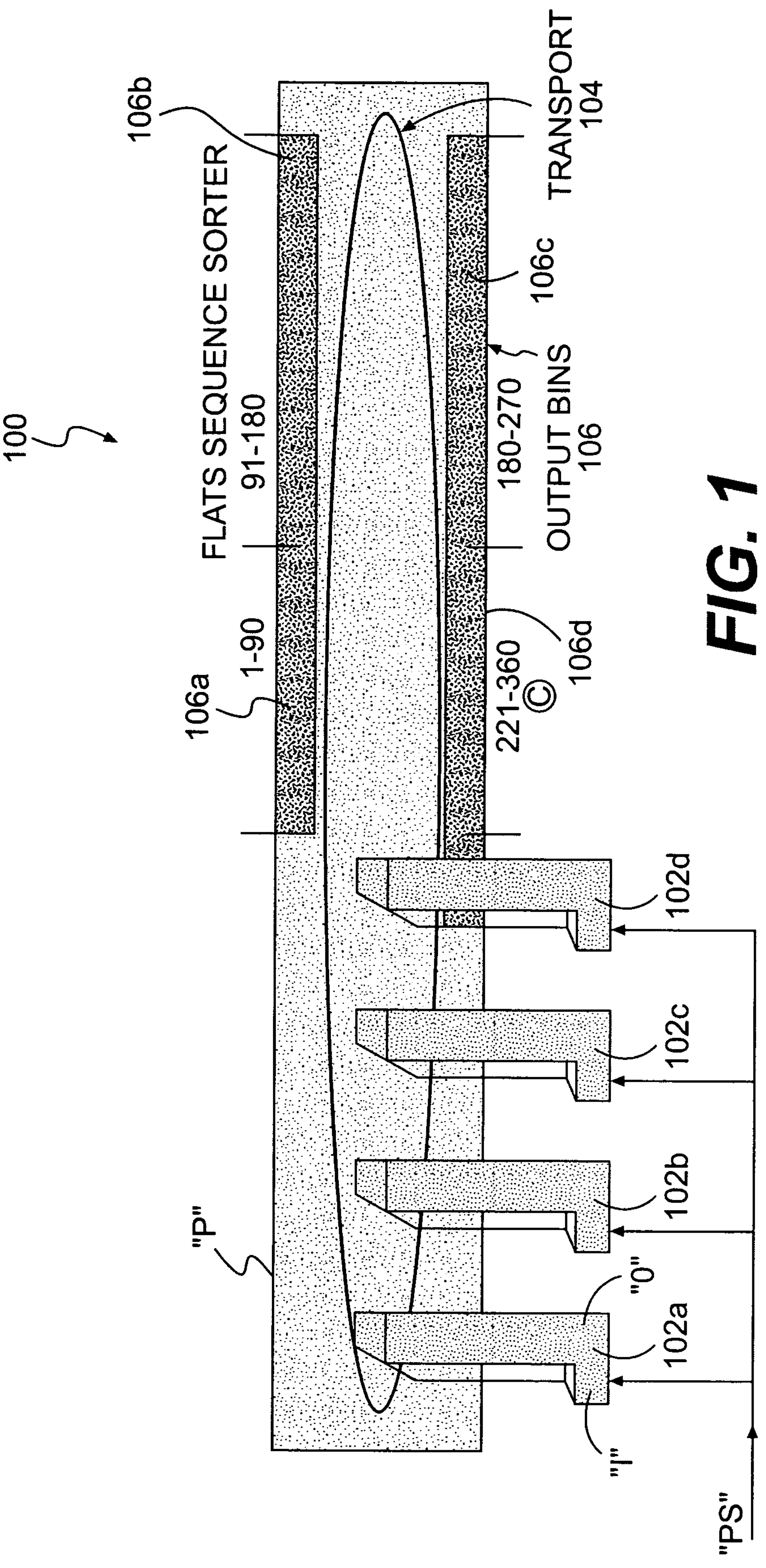
FIG. 1 shows one aspect of a sequencing system of the invention.

Referring now to FIG. 1, a general schematic diagram of a sequencing system is shown. In the embodiment of FIG. 1, the sequencing system is generally depicted as reference numeral 100 and includes a plurality of induction points or input feeding devices 102*a*, 102*b*, 102*c* and 102*d*. In the embodiment of FIG. 1, four input feeding devices are shown for illustration; however, the sequencing system may use any number of input feeding devices such as two, three or more input feeding devices depending on the particular application. In one embodiment, the input feeding devices each have a feed rate capacity of approximately 10,000 letters per hour, and may include a pause device "P" as well as an inserter "I" and an optical reader "O" such as an optical recognition reader (OCR), all communicating and controlled by a controller "C". Those of ordinary skill in the art should recognize that other feeding capacity rates may also be used with the invention, and that the input feeding devices illustrated herein are provided for showing an exemplary description of the invention.

Referring still to FIG. 1, a conventional type transporting system 104 is provided for transporting the products between the input feeding devices and output bins 106. In one aspect of the invention, the products, of product stream "PS", are inducted into any of the input feeding devices via the inserters "I" in any random order. The OCR will read a code associated with each of the products such as an address code or the like, and thereafter the product will be transported to a respective output bin 106 via the transporting system 104 under the control of controller "C".

In an embodiment, a grouping of contiguous output bins 106 may be designated for any number of respective carrier routes or groupings of product. In one example, four output groups 106*a*, 106*b*, 106*c* and 106*d* of output bins are each associated with respectively assigned input feeding devices 102*a*, 102*b*, 102*c* and 102*d*. In this particular embodiment, 90 output bins are associated with each output group for a total of 360 output bins. Although 90 output bins are illustrated herein, any number of output bins may be associated with each output group. Also, the output groups may correspond in number to the input feeding devices implemented by the invention.

Figure 2:
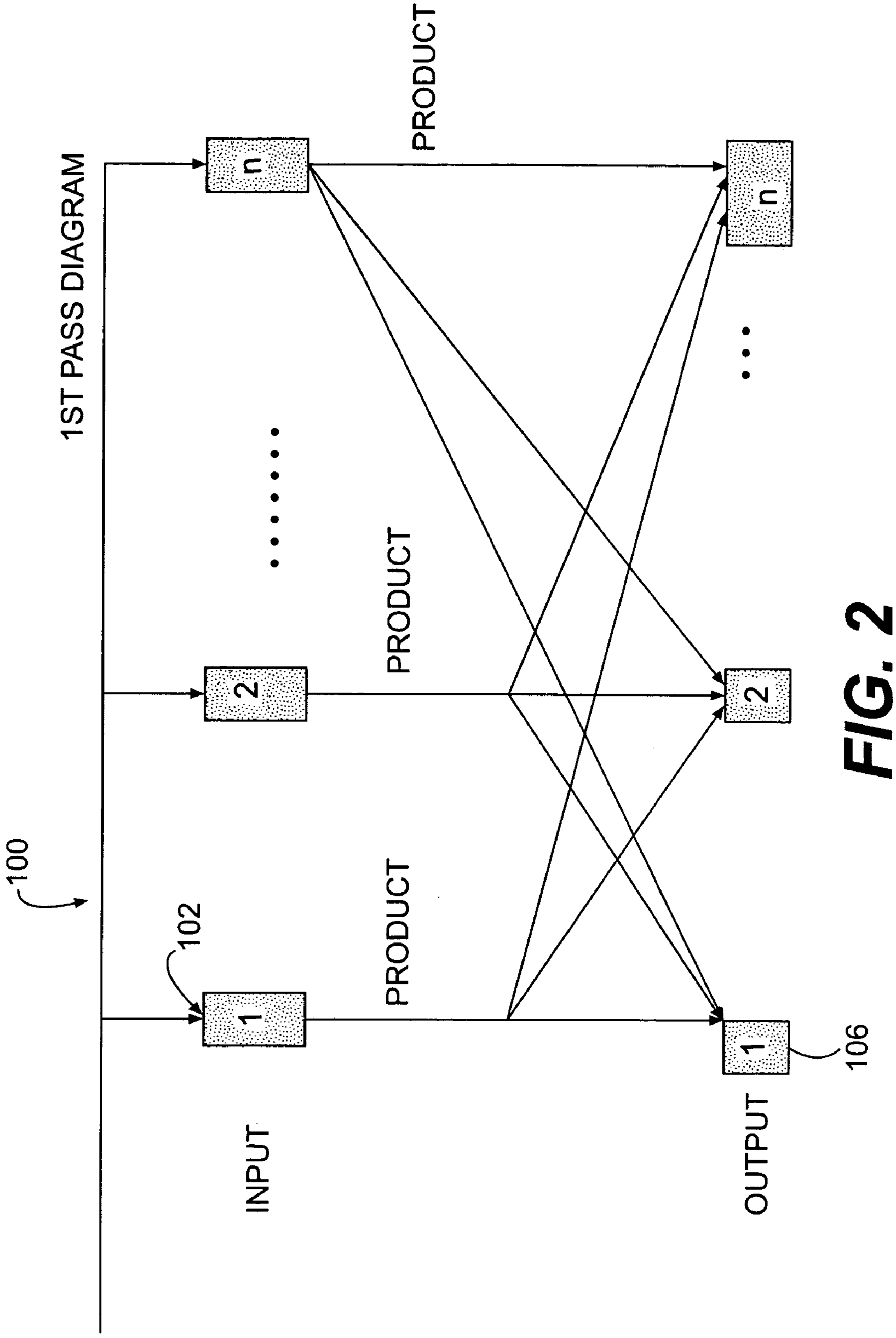
FIG. 2 shows a general schematic view of a first phase of sorting products using the sequencing system of the invention.

FIG. 2 shows a general schematic view of a first phase of sorting using the sequencing system 100. In the first pass phase, the product for any number of routes such as 1 through n routes is presented to the input feeding devices in any order to any input feeding device. The products are then fed through the input feeding devices and deposited into an output bin associated with one of the output groups based on a sort key or code, which is read by the OCR (discussed in greater detail below). That is, each input feeding device will read and process a portion of the sort key, via the OCR and controller "C", respectively, to direct the product to a particular output bin. In the first pass phase, all input feeding devices 1, 2, . . . n have complete access to all output bins of all the output groups 1, 2, . . . n such that no segregation of the route is required.

In the illustrative example of FIG. 2, after a first pass phase, the product may be segregated into groups of 10 routes each, where:

(i) product from routes 1-10 are in group 1, (ii) product from routes 11-20 are in group 2, and (iii) product from routes N are in group n.

Those of ordinary skill will recognize that this is only one example which may be implemented by the system and method of the invention.

Figure 3:
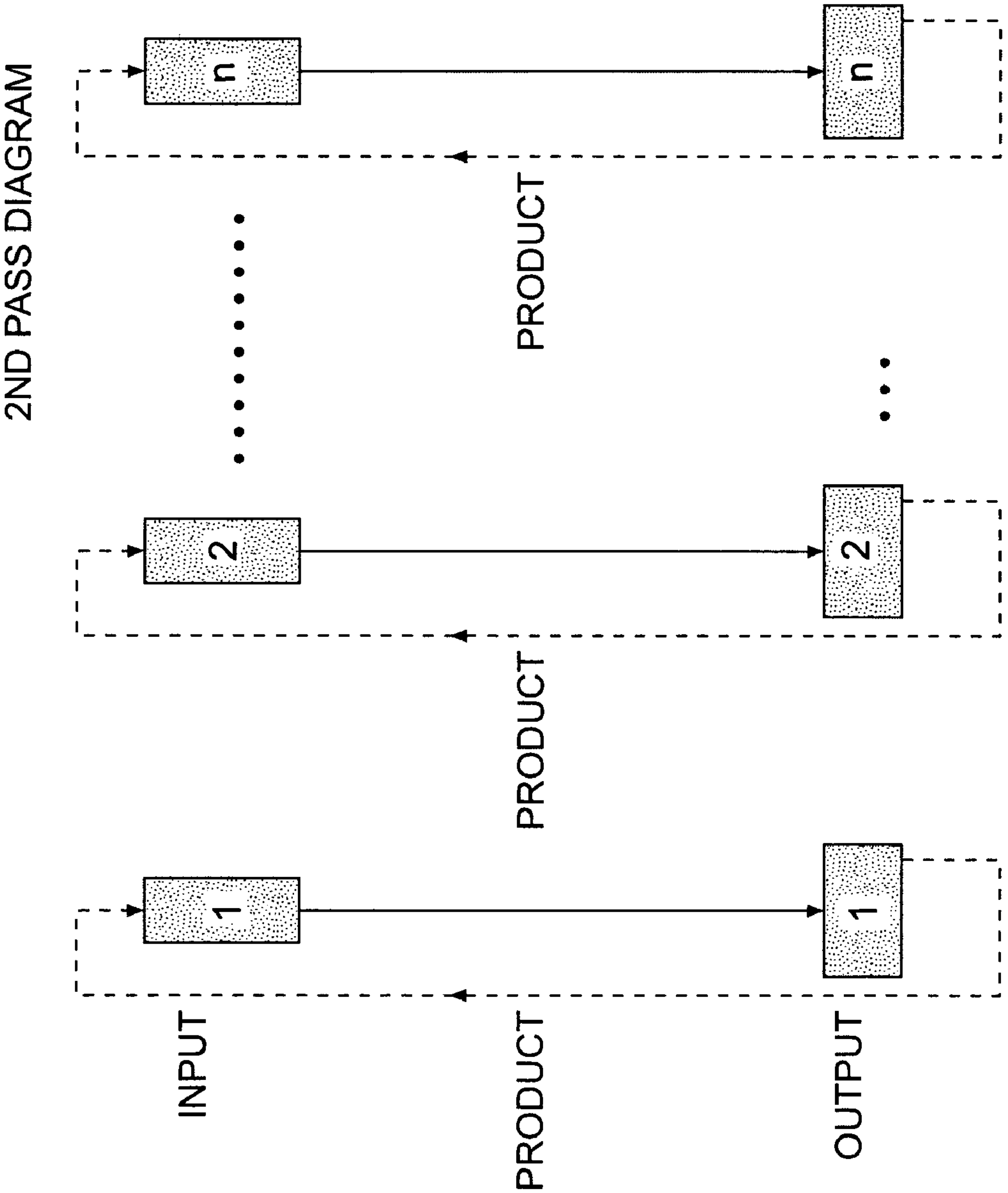
FIG. 3 shows a general schematic view of a second phase of sorting products using the sequencing system of the invention.

FIG. 3 shows a general schematic view of a second phase of sorting using the sequencing system 100. Each input feeding device is assigned a particular output group (e.g., four groups). Now, in a second pass phase, the product of the first output group will be fed through the first input feeding device to the output bins of the first output group, the product of the second output group will be fed through the second input feeding device to the output bins of the second output group, the product of the n output group will be fed through the n input feeding device to the output bins of the n output group, etc, all having a code read by a respective OCR of the input feeding devices. In this manner, the product is delivered to a respective output group, now in sequence. In one embodiment, the system is placed under a constraint to maintain the output groups between the first and second pass phase.

When the second pass phase is complete, the product in each grouping of n output groups will have its product in sequential order. The sequenced product will be passed out of the machine through a conveyor system that maintains the sequence of the product.

Method of Sequencing Product Using the System of the Invention

The system of the invention may be used for a single carrier route at a time, multiple routes at once or for warehousing or other sequencing needs of products. In one implementation, the sequencing method uses a two-pass sort scheme to sequence the product using multiple input feeding devices in both the first pass phase and the second pass phase. In the second pass phase, the product from each of the input feeding devices may be fed to output bins in a respective output group to increase the capacity of the system.

The sequencing system uses, in one embodiment, a disjoint sort key but other types of sort keys are also contemplated for use by the sequencing system of the invention. In one implementation, the scheme for sequencing the product may include:

1. Providing a sort code or sequence number for each product based on the address or other product information of the product.

2. Determining whether the product is going through a first pass or a second pass phase.

3. If the product is going through a first pass phase, the sequencing system will read a first portion of the sort key and assign the product to an appropriate output bin in one of the n output groups.

4. If the product is going through a second pass phase, the sequencing system will read a second, different portion of the sort key and assign the product to an appropriate output in the respective output group, now in a delivery point sequence.

5. The sequencing system is iterative and will continue both the first and the second pass phase in the manner described above until all of the products have passed through the system and the appropriate products have been provided in sequence after the second pass phase.

The use of the sorting scheme provided above is an illustrative example and, as such, it should be understood that the use of different codes or sort keys may equally be implemented by the invention without varying from the scope thereof.

Figure 4:
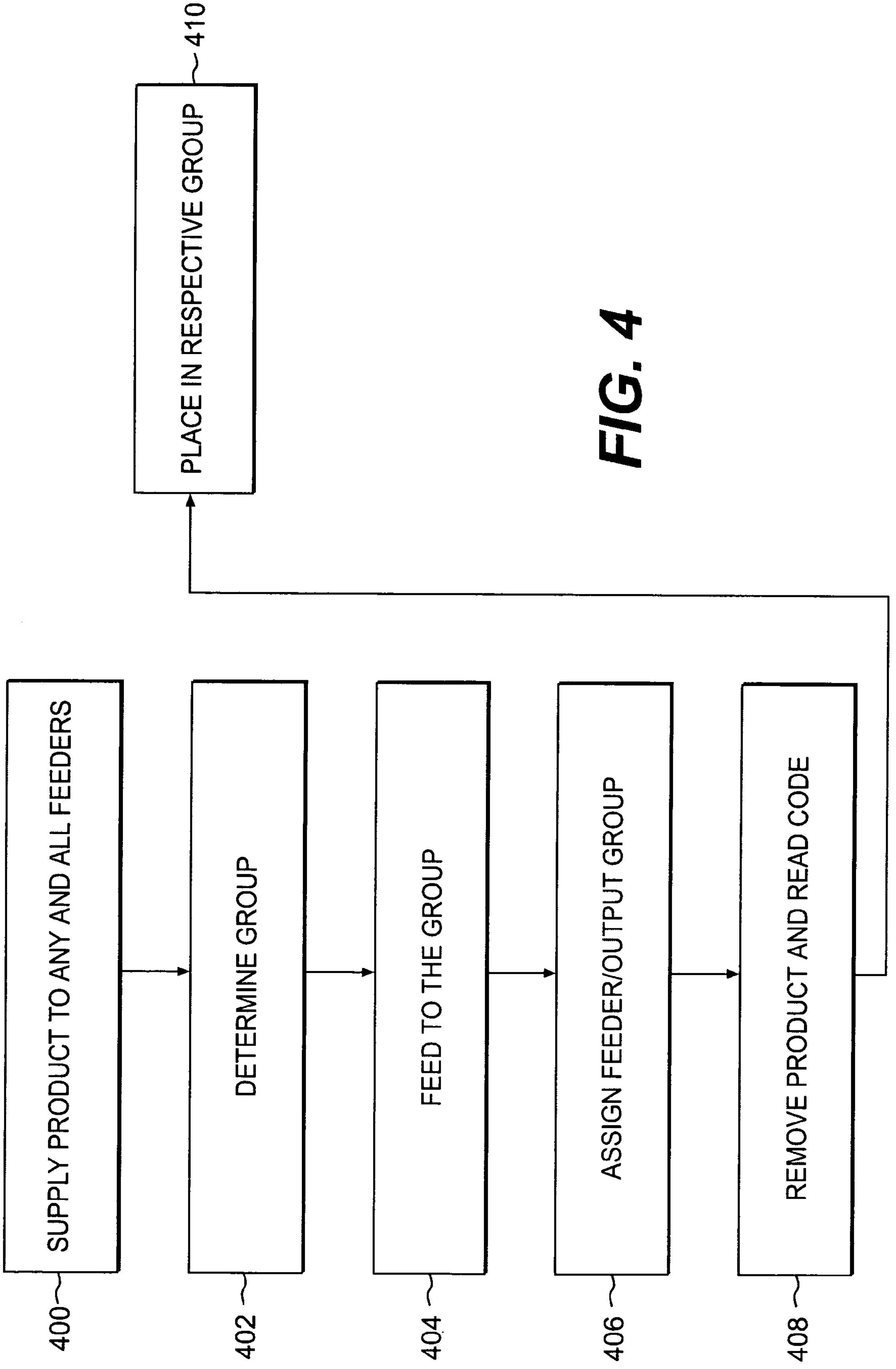
FIG. 4 is a flow diagram showing the steps implementing the invention.

FIG. 4 is a flow diagram implementing the steps of the invention. The controller "C" may be used to implement such steps of the invention as shown in FIG. 4 in a first and second mode of operation (first and second pass phase). In the first pass phase, all the product is presented, in a product stream, to any and all of the input feeding devices in any random order (step 400). In step 402, a determination is made as to which product will be fed to which output bin from each of the input feeding devices. In step 404, the product is fed and deposited to the specific output bin based on the sort key or associated code. That is, the OCR will read the sort key or associated code and the controller "C" will direct the product to a particular output bin of a particular output group, via the transporting system. All input feeding device have complete access to all output bins of each of the output groups in this phase such that no segregation is required. Additionally, the assigned groupings may be maintained for the following second pass phase.

In step 406, each input feeding device is assigned to a particular output group (e.g., four groups). In step 408, the products are removed from the output groups and read by the OCR of a respectively assigned input feeding device, i.e., product of group 1 will be fed through input feeding device 1. The products should, in an embodiment, remain in order of the bin count, i.e., 1-90 for each output group, when being fed through the respective input feeding device for the second pass phase.

During the second pass phase, each OCR of the respective input feeding device reads the sort key of a particular product (step 408). In the second pass phase the product being inducted into each input feeding device is identifiable as to order and group. In step 410, a constraint of the sequencing system now forces the product to its respective output group and only to those outputs. In other words, input feeding device 1 feeds product to output group 1 and the output bins in that group. This is repeated for the other groups, as well. This implementation provides a significant total realized throughput increase.

While the invention has been described in terms of embodiments, those skilled in the art will recognize that the invention can be practiced with modification within the spirit and scope of the appended claims.

It is claimed:

1. A system for sequencing products, comprising:

a plurality of input feeding devices each randomly receiving products from a stream of product;

a plurality of output groups corresponding to the plurality of input feeding devices during a first pass phase and a second pass phase, the plurality of input feeding devices feeding the product to a plurality of contiguous output bins of the plurality of output groups; and a control having a first mode of operation and a second mode of operation for the first pass phase and the second pass phase, respectively, wherein in the first mode, the control allows all input feeding devices of the plurality of input feeding devices complete access to all output groups of the plurality of output groups during the first pass phase, and in the second mode, the control constrains placement of the products to output groups assigned in the first pass phase such that the groupings of the products to the assigned output groups remain constant between the first pass phase and the second pass phase, wherein the control maintains a same grouping of contiguous output bins between the first pass phase and the second pass phase.

2. The system of claim 1, wherein the control, in the first mode, allows the products fed from any of the plurality of input feeding devices access to any output group of the plurality of output groups based on a code of the products.

3. The system of claim 1, wherein the control assigns each input feeding device to an associated particular output group of the plurality of output groups.

4. The system of claim 3, wherein the products, in the second pass phase, are fed through each of the assigned input device to each of the associated particular output group.

5. The system of claim 1, wherein each of the assigned output groups has a plurality of contiguous ones of the output bins such that, in the second pass phase, the products placed in the contiguous output bins of the each associated assigned output groups are fed to the each corresponding assigned input feeding device in a sequential order of the contiguous output bins in the each assigned output groups.

6. The system of claim 1, wherein the plurality of input devices is equal to the plurality of output groups.

7. The system of claim 1, wherein the control constrains each of the input feeding devices, on the second pass phase, to feeding product, received from a previously assigned output group maintained from the first pass phase, to a same output group in the second pass phase.

8. The system of claim 1, wherein the each output group of the plurality of output groups is designated for a number of routes.

9. The system of claim 1, wherein the plurality of input feeding devices is at least two input feeding devices.

10. The system of claim 1, wherein the plurality of input feeding devices is four input feeding devices and the plurality of output groups is equal to a number of the plurality of input feeding devices.

11. The system of claim 1, wherein the products are mail pieces.

12. The method of claim 1, wherein each of the plurality of input feeding devices comprises a pause device, an inserter, and an optical reader, all communicating with and controlled by the control.

13. A system for sequencing products, comprising:

a plurality of input feeding devices each randomly receiving products from a stream of product;

a plurality of output groups corresponding to the plurality of input feeding devices during a first pass phase and a second pass phase, the plurality of input feeding devices feeding the products to output bins of the plurality of output groups; and a control allowing all input feeding devices of the plurality of input feeding devices complete access to all output groups of the plurality of output groups during the first pass phase and assigning contiguous output bins to predetermined output groups of the plurality of output groups and associating each of the predetermined output groups with respective input feeding devices such that the predetermined output groups remain constant between the first pass phase and the second pass phase.

14. The system of claim 13, wherein the control constrains placement of the products to the predetermined output groups assigned in the first pass phase during the second pass phase such that the groupings of the products remain constant between the first pass phase and the second pass phase.

15. The system of claim 13, wherein the products, in the second pass phase, are fed through the respective input feeding devices to the associated predetermined output groups.

16. The system of claim 13, wherein the products are mail pieces.

17. The method of claim 13, wherein each of the plurality of input feeding devices comprises a pause device, an inserter, and an optical reader, all communicating with and controlled by the control.

18. A method of sequencing product, comprising the steps of:

providing a plurality of product from a stream of product to any of a plurality of input devices;

feeding each of the plurality of product, in a first pass phase, to an assigned group of contiguous output bins of a plurality of output groups based on a code associated with the each of the product, the plurality of product being fed by the plurality of input devices;

assigning each of the plurality of input devices to each of the assigned group of contiguous output bins; and constraining placement of the plurality of product during a second pass phase to the assigned group of contiguous output bins such that the assigned group of contiguous output bins remain constant between the first pass phase and a second pass phase.

19. The method of claim 18, further comprising assigning each of the plurality of input devices to feed product of the plurality of product, during the second sort phase, to each of the assigned group of contiguous output bins.

20. The method of claim 18, wherein the plurality of products are mail pieces.

* * * * *